US012750201B2

(12) United States Patent
Faxér et al.

(10) Patent No.: US 12,750,201 B2

(45) Date of Patent: Sep. 29, 2026

(54) CROSS LINK INTERFERENCE HANDLING

(71) Applicant: Telefonaktiebolaget LM Ericsson (publ), Stockholm (SE)

(72) Inventors: Sebastian Faxér, Stockholm (SE); Arne Simonsson, Gammelstad (SE); Jingya Li, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 942 days.

(21) Appl. No.: 17/619,366

(22) PCT Filed: Jun. 19, 2019

(86) PCT No.: PCT/EP2019/066185

§ 371 (c)(1),
(2) Date: Dec. 15, 2021

(87) PCT Pub. No.: WO2020/253954

PCT Pub. Date: Dec. 24, 2020

(65) Prior Publication Data

US 2022/0303108 A1 Sep. 22, 2022

(51) Int. Cl.

*H04L 5/14* (2006.01)
*H04B 17/336* (2015.01)

(Continued)

(52) U.S. Cl.

CPC ......... *H04L 5/1469* (2013.01); *H04B 17/336* (2015.01); *H04L 5/1461* (2013.01); *H04W 24/10* (2013.01); *H04W 56/001* (2013.01)

(58) Field of Classification Search

CPC ... H04L 5/1469; H04L 5/1461; H04B 17/336; H04W 24/10; H04W 56/001;

(Continued)

(56) References Cited

U.S. PATENT DOCUMENTS 11,206,549 B1 * 12/2021 Eyuboglu ......... H04W 72/1273
2016/0044549 A1 * 2/2016 Ji ........................ H04W 56/001
370/331

(Continued)

FOREIGN PATENT DOCUMENTS

KR 10-2018-0148556 * 11/2018
WO 2019031816 A1 2/2019

OTHER PUBLICATIONS

3GPP, "3rd Generation Partnership Project; Technical Specification Group Radio Access Network; NR; Base Station (BS) radio transmission and reception (Release 15)", 3GPP TS 38.104 V15.5.0, Mar. 2019, 1-208.

(Continued)

*Primary Examiner* — Ricky Q Ngo
*Assistant Examiner* — David M Kayal
(74) *Attorney, Agent, or Firm* — Murphy, Bilak & Homiller, PLLC

(57) ABSTRACT

There is provided mechanisms for cross link interference handling. A method is performed by a network node. The network node is configured to control a radio access network node. The method comprises obtaining, through measurements, information identifying cross link interference pertaining to wireless transmission from at least one neighbouring radio access network node. The method comprises controlling the radio access network node by performing a radio resource management action based on TDD configuration information derivable from the obtained information of cross link information of cross link interference. There is provided mechanisms for cross link interference reporting.

16 Claims, 8 Drawing Sheets

(51) Int. Cl.
*H04W 24/10* (2009.01)
*H04W 56/00* (2009.01)

(58) Field of Classification Search
CPC ............... H04W 72/20; H04W 72/541; H04W 72/0446; H04W 72/04; H04W 72/12; H04W 72/27; H04W 72/29
See application file for complete search history.

(56) References Cited

U.S. PATENT DOCUMENTS

| | | | | |
|---|---|---|---|---|
| 2017/0373795 | A1* | 12/2017 | Liu | H04J 11/005 |
| 2019/0350003 | A1* | 11/2019 | Jang | H04L 1/0005 |
| 2019/0363810 | A1* | 11/2019 | Luo | H04J 11/0053 |
| 2020/0169341 | A1* | 5/2020 | Hwang | H04W 24/10 |
| 2020/0329481 | A1* | 10/2020 | Yi | H04W 72/12 |
| 2020/0351690 | A1* | 11/2020 | Zhu | H04B 17/336 |
| 2021/0084655 | A1* | 3/2021 | Estevez | H04B 7/0408 |
| 2022/0103333 | A1* | 3/2022 | Ghozlan | H04W 88/08 |
| 2022/0201524 | A1* | 6/2022 | Ying | H04W 74/0866 |
| 2022/0217661 | A1* | 7/2022 | Yokomakura | H04B 7/155 |

OTHER PUBLICATIONS

3GPP, "3rd Generation Partnership Project; Technical Specification Group Radio Access Network; NR; Physical layer measurements (Release 15)", 3GPP TS 38.215 V15.4.0, Dec. 2018, 1-15.
3GPP, "3rd Generation Partnership Project; Technical Specification Group Radio Access Network; Evolved Universal Terrestrial Radio Access (E-UTRA); Physical channels and modulation (Release 15)", 3GPP TS 36.211 V15.5.0, Mar. 2019, 1-238.
Qualcomm Incorporated , "CLSI-RSSI and SRS-RSRP Measurement", 3GPP TSG-RAN WG2 Meeting #106, R2-1906109, Reno, Nevada, USA, May 13-17, 2019, 1-11.

* cited by examiner

CROSS LINK INTERFERENCE HANDLING

TECHNICAL FIELD

Embodiments presented herein relate to cross link interference handling in wireless cellular networks.

BACKGROUND

Wireless cellular networks are built up of cells, each cell defined by a certain coverage area of a radio access network node (RAN node). The RAN node communicates wirelessly with user equipment (UE) served by the wireless cellular network.

Communication is carried out in either paired or unpaired frequency spectrum. In case of paired frequency spectrum, the downlink (DL; from RAN node towards UE) and uplink (UL; from UE towards RAN node) directions are separated in frequency, thus utilizing Frequency Division Duplex (FDD). In case of unpaired frequency spectrum, the DL and UL use the same frequency spectrum but are separated in time, thus utilizing Time Division Duplex (TDD). For TDD the DL and UL are thus separated in the time domain, typically with a guard period (GP) between them. A GP serves several purposes. There is one GP at a DL-to-UL switch and one GP at an UL-to-DL switch, but since the GP at the UL-to-DL switch only needs to give enough time to allow the RAN node and the UE to switch between reception and transmission, and consequently typically is small, it is for simplicity neglected in the following description. The GP at the DL-to-UL switch should be sufficiently large to allow a UE to receive a (time-delayed) DL grant, scheduling the UL, and transmit the UL signal with proper timing advance (compensating for the propagation delay) such that it is received in the UL part of the frame at the RAN node. The GP at the UL-to-DL switch might be created with an offset to the timing advance. Thus, the GP should be larger than two times the propagation time towards a UE at the cell edge. Otherwise, the UL and DL signals in the cell will interfere. Because of this, the GP is typically chosen to depend on the cell size such that larger cells (i.e. larger inter-site distances) have a larger GP and vice versa.

Additionally, the GP reduces DL-to-UL interference between RAN nodes by allowing a certain propagation delay between cells without having the DL transmission of a first RAN node enter the UL reception of a second RAN node. In a typical macro network, the DL transmission power might be on the order of 20 dB larger than the UL transmission power. The pathloss between RAN nodes might be much smaller than the pathloss between RAN nodes and UEs. Hence, if the UL is interfered by the DL of other cells, so called cross-link interference (CLI), the UL performance can be seriously degraded. Because of the large transmit power discrepancy between UL and DL and/or propagation conditions, CLI can be detrimental to system performance not only for the co-channel case (where DL interferes UL on the same carrier) but also for the adjacent channel case (where DL of one carrier interferes with UL on an adjacent carrier). Because of this, macro networks utilizing TDD are typically operated in a synchronized and aligned fashion where the symbol timing is aligned and a semi-static TDD UL/DL pattern is used which is the same for all the cells in the NW. By aligning UL and DL periods so that they do not occur simultaneously the interference between UL and DL might be reduced. Unsynchronized networks and different TDD-patterns may cause severe co-channel or adjacent-channel interference, resulting in blocking radios and dropped calls. Mobile network operators with adjacent TDD carriers might synchronize their TDD UL/DL patterns to avoid adjacent channel CLI.

Many TDD frequency bands might be divided and allocated to several mobile network operators. The adjacent channels might be separated with guard bands. For many frequency bands, the adjacent channel isolation between different operators will not allow unsynchronized operation and different TDD patterns. Coordination between mobile network operators might be difficult to achieve. Further, defining a fixed TDD pattern for all RAN nodes might result in a waste of resources.

Further, efficient coordination between RAN nodes over backhaul might be cumbersome to achieve, often requiring many parties to be involved, such as several mobile network operators and equipment vendors. In practice, there are many challenges, e.g. backhaul signaling overhead, backhaul latency constraints, RAN node processing complexity, lack of a centralized processing, etc., which make it difficult to achieve any performance gain via network coordination.

The support for dynamic TDD enables communication based on the fifth generation, or new radio (NR), air interface to maximally utilize available radio resource in the most efficient way for both traffic directions. However, although dynamic TDD brings significant performance gain at low to medium loads, the performance benefits become smaller as the traffic load increases due to the CLI.

Hence, there is still a need for an improved handling of CLI.

SUMMARY

An object of embodiments herein is to provide efficient handling of CLI, not suffering from the issues noted above, or at least where these issues are mitigated or otherwise reduced.

According to a first aspect there is presented a method for cross link interference handling. The method is performed by a network node. The network node is configured to control a radio access network node. The method comprises obtaining, through measurements, information identifying cross link interference pertaining to wireless transmission from at least one neighbouring radio access network node. The method comprises controlling the radio access network node by performing a radio resource management action based on TDD configuration information derivable from the obtained information of cross link interference.

According to a second aspect there is presented a network node for cross link interference handling. The network node is configured to control a radio access network node. The network node comprises processing circuitry. The processing circuitry is configured to cause the network node to obtain, through measurements, information identifying cross link interference pertaining to wireless transmission from at least one neighbouring radio access network node. The processing circuitry is configured to cause the network node to control the radio access network node by performing a radio resource management action based on TDD configuration information derivable from the obtained information of cross link interference.

According to a third aspect there is presented a network node for cross link interference handling. The network node is configured to control a radio access network node. The network node comprises an obtain module configured to obtain, through measurements, information identifying cross link interference pertaining to wireless transmission from at least one neighbouring radio access network node. The network node comprises a control module configured to control the radio access network node by performing a radio resource management action based on TDD configuration information derivable from the obtained information of cross link interference.

According to a fourth aspect there is presented a computer program for cross link interference handling. The computer program comprises computer program code which, when run on processing circuitry of a network node configured to control a radio access network node, causes the network node to perform a method according to the first aspect.

According to a fifth aspect there is presented a method for cross link interference reporting. The method is performed by a terminal device. The terminal device is served by a radio access network node controlled by a network node. The method comprises measuring on a synchronization signal block transmitted by at least one neighbouring radio access network node, thereby obtaining information identifying cross link interference pertaining to wireless transmission from the at least one neighbouring radio access network node. The measuring is performed in accordance with a configuration provided by the network node. The configuration indicates that the measurements are for interference purposes. The method comprises reporting, to the network node and in accordance with the configuration, the information of cross link interference.

According to a sixth aspect there is presented a terminal device for cross link interference reporting. The terminal device is configured to be served by a radio access network node controlled by a network node. The terminal device comprises processing circuitry. The processing circuitry is configured to cause the terminal device to measure on a synchronization signal block transmitted by at least one neighbouring radio access network node, thereby obtaining information identifying cross link interference pertaining to wireless transmission from the at least one neighbouring radio access network node. The measuring is performed in accordance with a configuration provided by the network node. The configuration indicates that the measurements are for interference purposes. The processing circuitry is configured to cause the terminal device to report, to the network node and in accordance with the configuration, the information of cross link interference.

According to a seventh aspect there is presented a terminal device for cross link interference reporting. The terminal device is configured to be served by a radio access network node controlled by a network node. The terminal device comprises a measure module configured to measure on a synchronization signal block transmitted by at least one neighbouring radio access network node, thereby obtaining information identifying cross link interference pertaining to wireless transmission from the at least one neighbouring radio access network node. The measuring is performed in accordance with a configuration provided by the network node. The configuration indicates that the measurements are for interference purposes. The terminal device comprises a report module configured to report, to the network node and in accordance with the configuration, the information of cross link interference.

According to an eighth aspect there is presented a computer program for cross link interference reporting, the computer program comprising computer program code which, when run on processing circuitry of a terminal device configured to be served by a radio access network node controlled by a network node, causes the terminal device to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously, these methods, these network nodes, these terminal devices, and these computer programs provide efficient handling of cross link interference situations.

Advantageously, these methods, these network nodes, these terminal devices, and these computer programs enable optimization of, or at least identification of, the usage of local spectrum licenses.

Advantageously, these methods, these network nodes, these terminal devices, and these computer programs enable identification of which neighboring radio access network nodes (or mobile network operators) act as strong cross link interference aggressors.

Advantageously, these methods, these network nodes, these terminal devices, and these computer programs enable understanding of which time resources and/or geographical areas are protected from cross link interference and which time resources and/or geographical areas are impacted by cross link interference.

Advantageously, these methods, these network nodes, these terminal devices, and these computer programs enable spectrum regulations to be relaxed.

Advantageously, these methods, these network nodes, these terminal devices, and these computer programs enable improved scheduling coordination between different neighboring radio access network nodes (or mobile network operators), thereby enabling more freedom on planning of TDD patterns for some radio access network nodes (or mobile network operators) or geographical areas.

Advantageously, these methods, these network nodes, these terminal devices, and these computer programs can be used for radio resource management optimization.

Advantageously, these methods, these network nodes, these terminal devices, and these computer programs enable potential usage of dynamic TDD for improving user experience and system capacity. For instance, per beam/beam-direction dynamic TDD can utilized higher isolation for specific beams, and/or per device dynamic TDD can be utilized for terminal devices in good radio condition.

Advantageously, these methods, these network nodes, these terminal devices, and these computer programs can provide data as input to machine learning, or other types of artificial intelligence, algorithms for optimizing spectrum usage, and/or network planning.

It is to be noted that any feature of the first, second, third, fourth, fifth, sixth seventh, eight, and ninth aspects may be applied to any other aspect, wherever appropriate. Likewise, any advantage of the first aspect may equally apply to the second, third, fourth, fifth, sixth, seventh, eight, and/or ninth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
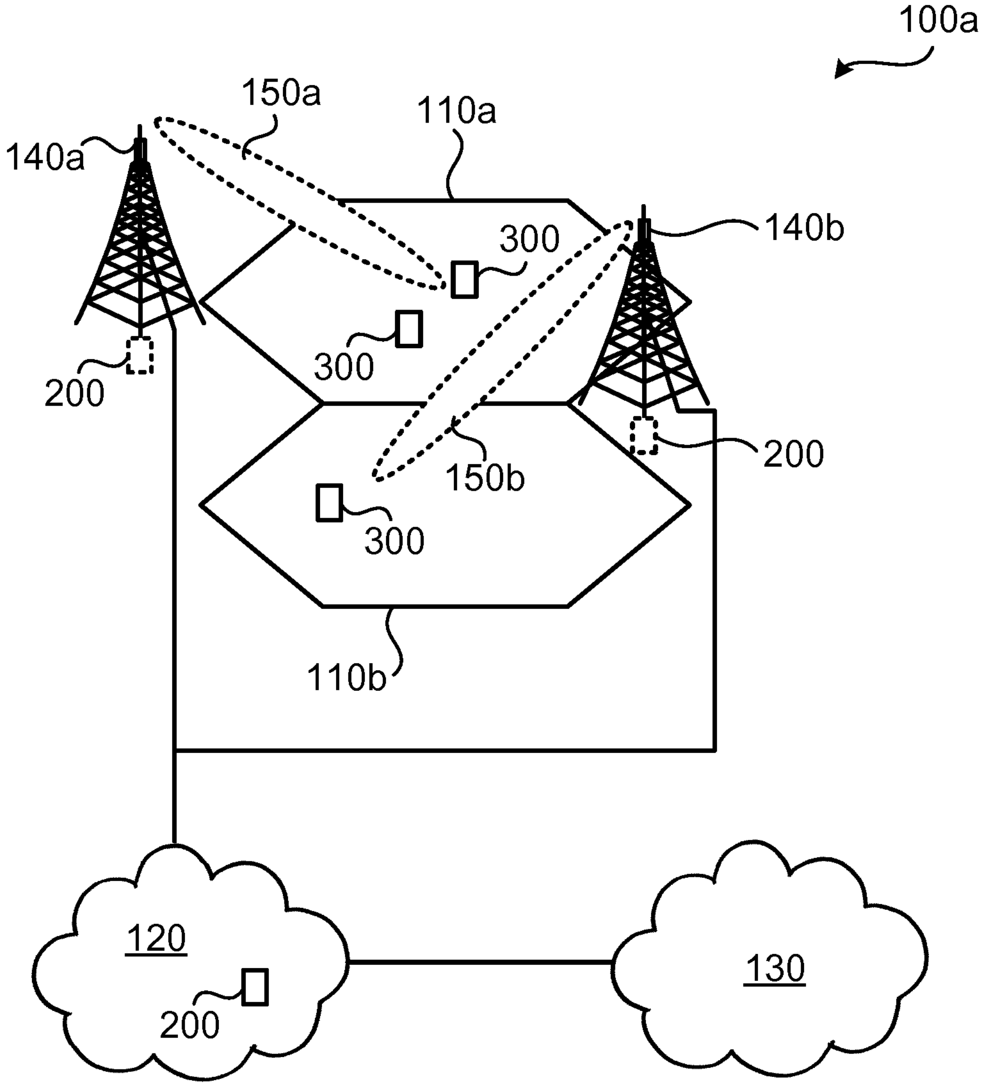
FIGS. 1, 4, 5, and 6 are schematic diagrams illustrating communication networks according to embodiments.

FIG. 1 is a schematic diagram illustrating a communication network 100*a* where embodiments presented herein can be applied. The communication network 100*a* comprises two radio access network nodes 140*a*, 140*b*. Each radio access network node 140*a*, 140*b* serves terminal devices 300 in its own cell 110*a*, 110*b*. Cells 110*a*, 110*b* and the radio access network nodes 140*a*, 140*b* collectively form a radio access network. The radio access network nodes 140*a*, 140*b* are operatively connected to a core network 120 which in turn is operatively connected to a service network 130. The terminal devices 300 are thereby enabled to access services of, and exchange data with, the service network 130. Each radio access network node could be a radio base station, base transceiver station, node B, evolved node B (eNB), NR base station (gNB), access point, or access node. Each terminal device could be a portable wireless device, mobile station, mobile phone, handset, wireless local loop phone, user equipment (UE), smartphone, laptop computer, tablet computer, wireless modem, wireless sensor device, Internet of Things (IoT) device, or network equipped sensor. Each radio access network node 140*a*, 140*b* is controlled by a network node 200. The network node 200 might be collocated with, integrated with, or part of, the radio access network node 140*a*, 140*b* controlled by the network node 200, which in combination is a radio base station, base transceiver station, node B, evolved node B (eNB), NR base station (gNB), access point, or access node. In other examples the network node 200 is physically separated from the radio access network nodes 140*a*, 140*b*.

It will below, for illustrative purposes, be assumed that radio access network node 140*a* takes the role of a victim and that radio access network node 140*b* takes the role of an aggressor, with respect to cross link interference. However, it could be that radio access network node 140*a* acts as aggressor and radio access network node 140*b* acts as victim, and/or that both radio access network nodes 140*a*, 140*b* act as both aggressor and victim.

The embodiments disclosed herein relate to mechanisms for cross link interference handling and cross link interference reporting. In order to obtain such mechanisms there is provided a network node 200, a method performed by the network node 200, a computer program product comprising code, for example in the form of a computer program, that when run on processing circuitry of the network node 200, causes the network node 200 to perform the method. In order to obtain such mechanisms there is further provided a terminal device 300, a method performed by the terminal device 300, and a computer program product comprising code, for example in the form of a computer program, that when run on processing circuitry of the terminal device 300, causes the terminal device 300 to perform the method.

Before disclosing embodiments for cross link interference handling and cross link interference reporting, a short introduction to some concepts relating to radio frame structures used in the Long Term Evolution (LTE) and NR suites of telecommunications standards as knowledge of these concepts will useful in the following.

In the third generation partnership project (3GPP) technical specification (TS) 36.211, entitled "Evolved Universal Terrestrial Radio Access (E-UTRA); Physical channels and modulation", version 15.5.0, three radio frame structures are supported. Frame structure type 1 (FS 1) is applicable to FDD only, frame structure type 2 (FS 2) is applicable to TDD only, and frame structure type 3 (FS 3) is applicable to licensed assisted access (LAA) secondary cell operation only.

With FS 2 for TDD, each radio frame of length 10 ms consists of two half-frames of length 5 ms each. Each half-frame consists of five subframes (SFs) of length 1 ms.

Each subframe (SF) is defined by two slots of length 0.5 ms each. Within each radio frame, a subset of SFs is reserved for UL transmissions, and the remaining SFs are allocated for DL transmissions, or for special SFs, where the switch between DL and UL occurs.

As shown in Table 4.2-2 of aforementioned 3GPP TS 36.211, seven different DL/UL configurations are supported for FS 2. Here, "D" denotes a DL SF, "U" denotes an UL SF, and "S" represents a special SF. Configurations 0, 1, 2, and 6 have 5 ms DL-to-UL switch-point periodicity, with the special SF exists in both SF 1 and SF 6. Configurations 3, 4 and 5 have 10 ms DL-to-UL switch-point periodicity, with the special SF in SF 1 only.

A special SF is split into three parts; a DL part (DwPTS), GP and an UL part (UpPTS). In aforementioned 3GPP TS 36.211, a set of DwPTS/GP/UpPTS configurations is supported. The DwPTS with a duration more than 3 symbols can be treated as a normal DL SF for data transmission. The UpPTS is not used for data transmission due to its very short duration for special SF configurations 0-9. Instead, the UpPTS for these configurations can be used for channel sounding or random access. In LTE Release 14, a special SF configuration 10 was introduced for uplink coverage enhancement, and the UpPTS of this configuration can be used for uplink data transmission.

Typically, the DL/UL configuration and the configuration of the special SF used in a cell are signaled as part of the system information, which is included in system-information block 1 (SIB1) and broadcasted every 80 ms within SF 5. More specifically, a terminal device 300 can be configured by higher layers to monitor physical downlink control channels (PDCCHs) with cyclic redundancy check (CRC) scrambled by the eIMTA-RNTI, where eIMTA is short for enhanced Interference Mitigation and Traffic Adaptation, and where RNTI is short for Radio Network Temporary Identifier. By detecting the downlink control information (DCI) carried on the PDCCHs (i.e., DCI format 1C), the terminal device 300 knows the reconfigured TDD UL/DL configurations for one or more serving cell(s).

Similar to LTE, NR supports semi-static TDD UL/DL configurations by cell-specific Radio Resource Control (RRC) signaling by means of TDD-UL-DL-Configuration-Common in SIB1. In contrast to LTE, up to two concatenated TDD DL-UL patterns can be configured in NR. Each TDD DL-UL pattern is defined by a number of consecutive full DL slots (given by the value of the parameter nrofDownlinkSlots) at the beginning of the TDD pattern, a number of consecutive DL symbols in the slot following the full DL slots (given by the value of the parameter nrofDownlinkSymbols), a number of symbols between DL and UL segments (GP, or flexible symbols), a number of UL symbols in the end of the slot preceding the first full UL slot (given by the value of the parameter nrofUplinkSymbols), and a number of consecutive full UL slots at the end of the TDD pattern (given by the value of the parameter nrofUplinkSlots). The periodicity of a TDD DL-UL pattern (given by the value of the parameter dl-UL-TransmissionPeriodicity) can be configured ranging from 0.5 ms to 10 ms.

Besides the cell-specific TDD UL/DL configuration via TDD-UL-DL-ConfigurationCommon, a terminal device 300 can be additionally configured by an device-specific RRC signaling (given by the value of the parameter TDD-UL-DL-ConfigDedicated) to override only the flexible symbols provided in the cell-specific semi-static TDD configuration.

In addition, NR supports dynamic TDD. Dynamic TDD operation may be realized either by dynamical signalling of the DL, flexible, and UL allocation on symbol level for one or multiple slots to a group of terminal devices by using a Slot Format Indicator (SFI) in a DCI carried on a group-common PDCCH (DCI Format 2_0). The SFI carried in a DCI format 2_0 indicates, to a group of terminal devices, a slot format for each slot in a number of slots starting from a slot where the DCI format 2_0 is detected. Dynamic TDD operation may also be realized with SFI signaling, where all slots may be semi-statically configured as flexible and the terminal devices may determine the link direction directly from their scheduling DCIs.

Figure 2:
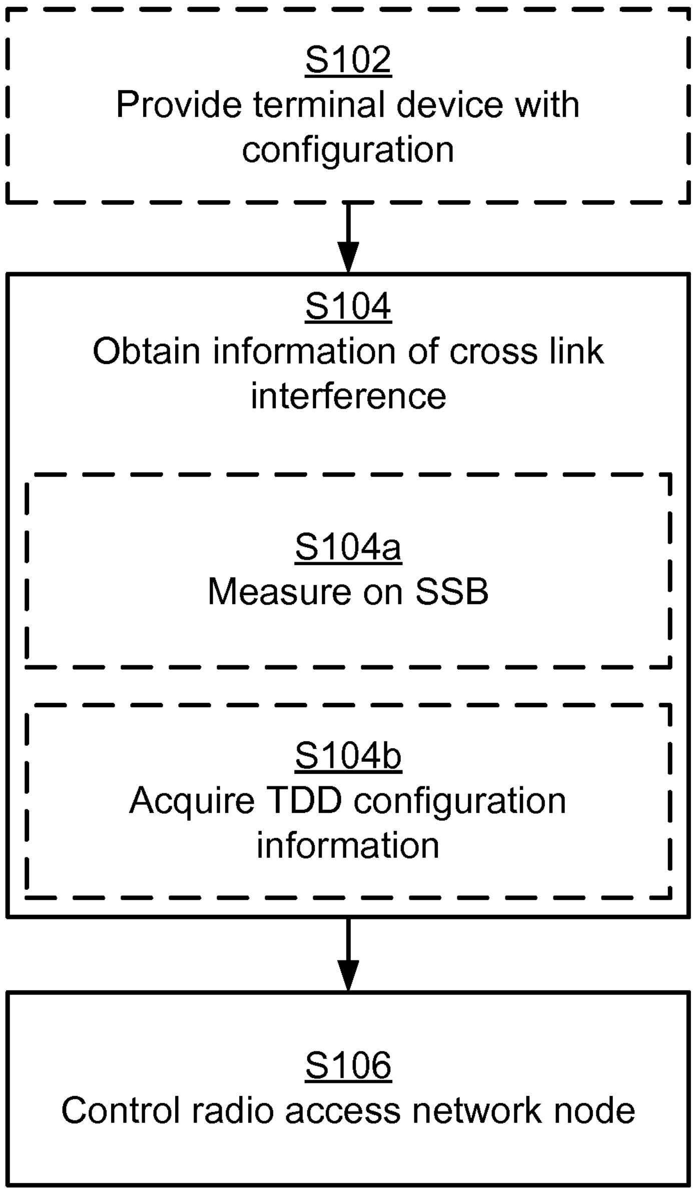
FIGS. 2 and 3 are flowcharts of methods according to embodiments.

Reference is now made to FIG. 2 illustrating a method for cross link interference handling as performed by the network node 200 according to an embodiment. The network node 200 is configured to control a radio access network node 140*a*.

S104: The network node 200 obtains, through measurements, information identifying cross link interference pertaining to wireless transmission from at least one neighbouring radio access network node $\mathbf{140}_b$.

S106: The network node 200 controls the radio access network node 140*a* by performing a radio resource management action. The radio resource management action is based on TDD configuration information derivable from the obtained information of cross link interference.

Embodiments relating to further details of cross link interference handling as performed by the network node 200 will now be disclosed.

There may be different ways for the network node 200 to obtain the information identifying cross link interference, as in S104. Different embodiments relating thereto will now be described in turn.

According to some embodiments, the information of cross link interference is obtained through measurements performed by the network node 200.

The network node 200 might apply at least some of the following actions to understand the cross link interference situation pertaining to wireless transmission from the at least one neighbouring radio access network node 140*b*.

In some aspects the measurements are performed on synchronization signal blocks. In particular, according to an embodiment, the network node 200 is configured to perform (optional) step S104*a* as part of S104:

S104*a*: The network node 200 measures on a synchronization signal block (SSB) transmitted by the at least one neighbouring radio access network node 140*b*.

The network node 200 might scan adjacent channels (i.e., channels adjacent to those allocated to the radio access network node 140*a*) to detect the synchronization signals (SS) or SSB transmitted from neighboring radio access network nodes 140*b* to identify potential aggressors.

In some aspects, the network node may need to perform scheduling avoidance, e.g., not scheduling any DL transmissions when the network node is doing such adjacent channel measurements in these DL symbols and avoid performing such adjacent channel measurements on the DL symbols that are used for transmitting its own common DL signals like SSB. This would be performed to avoid that the measurement on adjacent channels could be interfered by its own operating channel in the DL slots/symbols. The network node measurements are expected to be very infrequent, so the overhead of not scheduling a DL transmission when doing such measurements should be limited.

In some aspects, the SS or SSB is measured on in frequencies given by a list of frequency bands. In more detail, as the possible positions of SSs or SSBs are limited by the synchronization raster, the network node 200 does not need to blindly search through all possible positions but may only try to detect the SS or SSB of potential neighboring radio access network nodes 140*b* according to a list of frequency bands corresponding to adjacent NR-ARFCNs (absolute radio-frequency channel numbers) and in each such frequency band only search through the possible SS or SSB physical resource block (PRB) positions according to the synchronization raster.

The identification of potential aggressor neighboring radio access network nodes 140*b* may be performed in different ways. For instance, the network node 200 might first measure the signal quality of each of the detected SSs or SSBs from the neighboring radio access network nodes 140*b*, and then the network node 200 determines if the detected neighboring radio access network nodes 140*b* should be considered as potential aggressors by comparing the measurements of each detected neighboring radio access network node 140*b* with a threshold. In particular, according to an embodiment, the TDD configuration information only is acquired when signal strength of the SS or SSB is measured to be above a threshold value. The measurement of each detected neighboring radio access network node 140*b* may in some examples be defined as the received signal strength indicator (RSSI), reference signal received power (RSRP), signal to interference plus noise ratio (SINR), and/or reference signal received quality (RSRQ) of the detected SS or SSB, or in other embodiments, using different measurement quantities derived from the received signal. That is, according to some examples, the threshold value is given with respect to at least one of: RSSI, RSRP, SINR, and RSRQ. Further, according to some examples, the threshold value is based on a spectrum mask or an adjacent channel suppression capability of the network node 200.

The threshold might thus be based on the spectrum mask of the network node 200 (or of the radio access network node 140*a*) and/or adjacent channel suppression capabilities of the network node 200 (or of the radio access network node 140*a*). The threshold might thus further be based on, or combined with, standard specified transmission spectrum masks, as disclosed in clause 6.6 of 3GPP TS 38.104, entitled "NR; Base Station (BS) radio transmission and reception", version 15.5.0, which it then might be assumed that the at least one neighboring radio access network node 140*b* is compliant with. If the measurement of a detected neighboring radio access network node 140*b* is lower than the threshold, i.e., the signal strength received from this neighboring radio access network node 140*b* is low enough to be suppressed by the adjacent channel isolation, then, this detected neighboring radio access network node 140*b* might not be considered as a potential aggressor. Otherwise, this neighboring radio access network node 140*b* might be considered as a potential aggressor.

Further aspects of possible actions taken by the network node 200 where the neighboring radio access network node 140*b* is considered as a potential aggressor will now be disclosed.

In particular, according to an embodiment, the network node 200 is configured to perform (optional) step S104*b* as part of S104:

S104*b*: The network node 200 acquires the TDD configuration information from the at least one neighbouring radio access network node 140*b* by decoding at least one system information block in time/frequency resources transmitted by the at least one neighbouring radio access network node 140*b*. The time/frequency resources are defined by the synchronization signal block.

In more detail, after identifying a potential aggressor (as defined by the at least one neighboring radio access network node 140*b*), the network node 200 might further decode the MIB (which is the payload comprised in the PBCH of the SSB) and/or SIB1 of all the identified neighboring radio access network node 140*b* considered to represent aggressors. In order to decode the SIB1, the network node 200 might first decode the MIB to acquire the control-resource set (CORESET) and PDCCH monitoring occasions configuration for type0-PDCCH common search space (CSS), to know where to monitor the PDCCH used for scheduling the physical downlink shared channel (PDSCH) carrying SIB1. By decoding the PDCCH, the network node 200 acquires the information of where and when the PDSCH comprising SIB1 is scheduled. In some examples, the TDD configuration information is defined by the parameter tdd-UL-DL-ConfigurationCommon. The network node 200 might obtain TDD related information (i.e. cell-specific TDD DL/UL configuration given by the tdd-UL-DL-ConfigurationCommon parameter) of each identified at least one neighbouring radio access network node 140*b* by decoding its SIB1. The network node 200 might obtain the DL symbol timing of each identified at least neighbouring radio access network node 140*b* by detecting the associated SS or SSB. The network node 200 might obtain the SSB index of each identified at least one neighbouring radio access network node 140*b* by decoding the MIB. The network node 200 might further obtain interfering beam related information of each identified at least one neighbouring radio access network node 140*b*, if the mapping between the SSB beam directions and SSB indices are common for all radio access network nodes 140*a*, 140*b*. To enable further utilization of the UL/DL flexibility the SIB1 information can be extended with additional refined TDD configuration information such as: rescheduling time of flexible slots, UL-DL utilization, and/or current use of flexible slots.

According to some embodiments, the information of cross link interference is obtained through receiving measurements performed by a terminal device 300 served by the radio access network node 140*a*.

In some aspects the network node 200 configures the terminal device 300 for such reporting. In particular, according to an embodiment, the network node 200 is configured to perform (optional) step S102:

S102: The network node 200 provides the terminal device 300 with a configuration to perform the measurements and to report the measurements to the network node 200. The configuration indicates that the measurements are for interference purposes. As described below, measurements may be disregarded if the transmissions would not result in interference and therefore an indication that the measurements are for interference purposes means that only measurements of transmissions which may cause interference are required.

There could be different types of configurations that in S102 are provided to the terminal device 300.

In some aspects the configuration specifies how the terminal device 300 is to perform measurements. In particular, according to an embodiment, the configuration specifies at least one of: which time/frequency resources the measurements are to be performed on, which frequency bands the measurements are to be performed in, and a list of absolute radio-frequency channel numbers.

In some aspects the configuration explicitly notifies the terminal device 300 that the measurements are for interference purposes. In particular, according to an embodiment, the configuration comprises an explicit indication that the measurements are for interference purposes.

In some aspects the configuration only implicitly notifies the terminal device 300 that the measurements are for interference purposes. In particular, according to an embodiment, the configuration indicates that the measurements are for interference purposes by setting a threshold value for the measurements such that the terminal device 300 is configured to only report measurements above the threshold value.

In some aspects the network node 200 collects a set of measurements, identifying the information of cross link interference. The set of measurements might be obtained from one single terminal device 300 or from two or more terminal devices 300. In particular, according to an embodiment, the information of cross link interference is obtained through receiving a set of measurements performed by at least one terminal device 300 served by the radio access network node 140*a*. The information of cross link interference might be accompanied by position information of each terminal device 300. The information of cross link interference might then be defined by statistics of the set of measurements as collected over a period of time. There could be different periods of time over which the measurements are collected. In some aspects, the statistics are long-time statistics. In particular, in some examples, the period of time extends at least 12 hours, preferably at least 24 hours. In some aspects, the statistics are short-time statistics. In particular, in some examples, the period of time extends at least 1 minute and at most 12 hours. For a semi-static TDD configuration case, statistics might be collected from several terminal devices 300 with position information over longer time periods, such as from 24 hours up to a week. The position can be geographical position (GPS or other network positioning), direction (direction of arrival or used beam) or other indication dividing the cell into parts with different adjacent channels with potential interference. For time-dynamic TDD configuration case, the reported measurements from all terminal devices 300 might be aggregated for shorter time periods, such as from minutes to hours. The TDD configuration might then be updated to adapt to common UL-DL traffic variations from hourly service usage common for several mobile network operators.

The network node 200 might combine the information acquired based on detecting SSBs from multiple neighbouring radio access network nodes 140*b* to understand the cross link interference situations (e.g., always cross link interference, potential cross link interference, or no cross link interference; cross link interference from a few neighbouring radio access network nodes 140*b*, cross link interference from many neighbouring radio access network nodes 140*b*) for different slots/symbols, etc. That is in some aspects, pieces of information of cross link interference pertaining to wireless transmission from at least two neighbouring radio access network nodes 140*b* are obtained. In some embodiments, the pieces of information are combined when controlling, as in S106, the radio access network node 140*a*.

The knowledge of the cross link interference might by the network node 200 be used in different ways and for different purposes. For instance, the network node 200 might apply different types of radio resource management actions for cross link interference avoidance and/or mitigation. Different examples of radio resource management actions will be disclosed next. In some examples, performing the radio resource management action comprises at least one of: reconfiguring TDD configuration in terms of TDD UL/DL allocation of time/frequency resources for the radio access network node 140*a* such that the time/frequency resources do not conflict with the cross link interference; determining which time/frequency resources and/or geographical areas are impacted by the cross link interference; identifying which at least one neighbouring radio access network node 140*b* is causing the cross link interference; and reporting the cross link interference to a central network node. The central network node may be, for example, an operation and maintenance (OAM) node which enables a network operator to obtain the cross link interference information and, for example, to adapt TDD UL/DL allocation and/or modify neighbor cell relations.

In further detail, utilizing the TDD UL/DL configuration or SSB index or beam information of the identified potential aggressors (as defined by the at least one neighbouring radio access network node 140*b*), the network node 200 might improve its radio resource management by for instance reconfiguring its own TDD UL/DL allocation and/or proactively scheduling to avoid severe cross link interference.

The following examples describe how to utilize such information for improved uplink scheduling and/or scheduling avoidance. The same methodologies might be applied for improved downlink scheduling and/or scheduling avoidance as well.

As an example, by knowing the SSB index of the identified aggressor, the network node 200 might avoid scheduling UL transmissions in the PDCCH monitoring occasions of the type0-PDCCH CCS set associated to the SSB index, such that the uplink transmissions by the radio access network node 140*a* controlled by the network node 200 will not be interfered with the PDCCHs transmitted by the at least one neighbouring radio access network node 140*b*.

As another example, utilizing the knowledge of the interfering SSB beam direction of the identified aggressor, the network node 200 can schedule an uplink transmission such that the reception beam direction at the radio access network node 140*a* controlled by the network node 200 is not interfered by the SSB transmissions from the at least one neighbouring radio access network node 140*b* and the DL transmissions quasi-collocated with the SSB beam of the aggressor.

For instance, the network node 200 can avoid scheduling UL transmissions for the radio access network node 140*a* in the UL time slots/symbols that always experience cross link interference from the at least one neighbouring radio access network node 140*b*, thus avoiding any uplink reception blocking from severe adjacent TDD interference. If demanded by frequency spectrum requirements or agreed upon between mobile network operators, also downlink symbols may be restricted, thus avoiding aggressor TDD interference in uplink at surrounding adjacent channels from at least one neighbouring radio access network node 140*b*.

The scheduling restriction might be applied per device, based on the radio conditions of the terminal devices 300 and/or quality of service (QoS) requirements of the terminal devices 300. That is, in some aspects, an individual radio resource management action is (as in S106) performed per terminal device 300, or per subset of terminal devices 300, served by the radio access network node 140*a*.

For example, if a certain terminal device 300 has good radio conditions and strong uplink signals, or it has a relatively lower QoS requirement, then, a small adjacent interference might be considered as less severe. The scheduling restriction (as defined by the radio resource management action) might be applied per signal/channel basis. For instance, the network node 200 might avoid transmission from the radio access network node 140*a* of uplink signals/channels considered as important (e.g. transmission on a Physical Random Access Channel; PRACH) on the time resources which are severely interfered.

The above different aggregations levels and time scales can be combined. For example, the semi-static cell-specific TDD pattern can be configured based on the TDD related information reported from the terminal devices 300, while flexible TDD can be used for scheduling of individual terminal devices 300 based on the individual measurements from each terminal device 300.

Further, in some examples, the at least one neighbouring radio access network node 140*b* is configured for beamformed transmission, and the information of cross link interference is obtained per beam or beam-direction of the beamformed transmission.

Further, the scheduling restriction might be applied per beam or beam direction. In some examples, the radio access network node 140*a* is configured for beamformed transmission. The radio resource management action as in S106 might then be performed per beam or beam-direction of the beamformed transmission.

Figure 3:
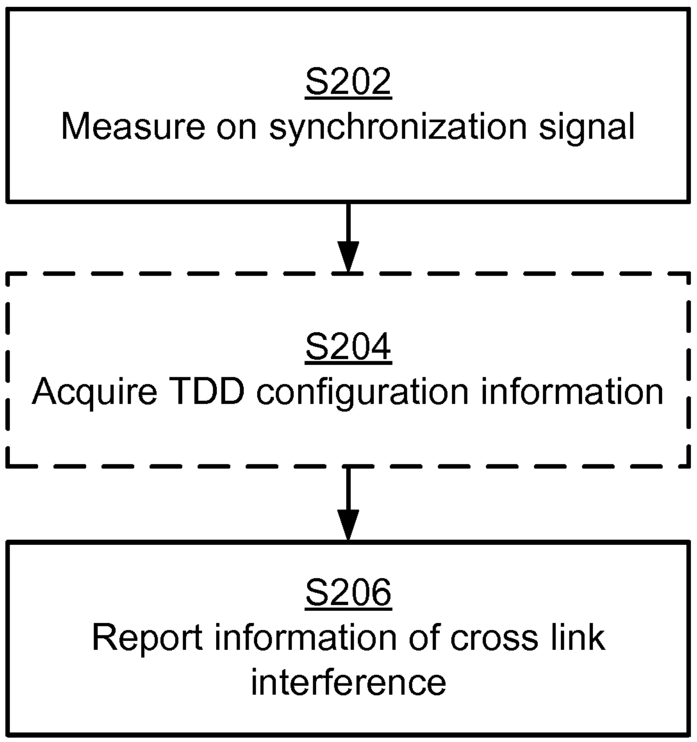

Reference is now made to FIG. 3 illustrating a method for cross link interference reporting as performed by the terminal device 300 according to an embodiment. The terminal device 300 is served by a radio access network node 140*a*.

S202: The terminal device 300 measures on a synchronization signal block transmitted by at least one neighbouring radio access network node 140*b*. The terminal device 300 thereby obtains information identifying cross link interference pertaining to wireless transmission from the at least one neighbouring radio access network node 140*b*. The measuring is performed in accordance with a configuration provided by the network node 200. The configuration indicates that the measurements are for interference purposes.

S206: The terminal device 300 reports, to the network node 200 and in accordance with the configuration, the information of cross link interference.

The reported information might be used to assist the network node 200 controlling the serving radio access network node 140*a* for identification of potential aggressors identification, better TDD planning, and other types of radio resource management optimization.

Embodiments relating to further details of cross link interference reporting as performed by the terminal device 300 will now be disclosed.

As disclosed above, there could be different types of configurations according to which the measuring in S202 is performed.

In some aspects the configuration explicitly notifies the terminal device 300 that the measurements are for interference purposes. In particular, according to an embodiment, the configuration comprises an explicit indication that the measurements are for interference purposes.

In some aspects the configuration only implicitly notifies the terminal device 300 that the measurements are for interference purposes. In particular, according to an embodiment, the configuration indicates that the measurements are for interference purposes by setting a threshold value for the measurements such that the terminal device 300 is configured to only report measurements above the threshold value.

In some aspects the configuration specifies how the terminal device 300 is to perform measurements. In particular, according to an embodiment, the configuration specifies at least one of: which time/frequency resources the measurements are to be performed on, which frequency bands the measurements are to be performed in, and a list of absolute radio-frequency channel numbers. The configuration might thus include which frequency bands the terminal device 300 shall try to detect SSs or SSBs transmitted by neighboring radio access network nodes 140*b*. This information might be conveyed as a list of NR-ARFCNs.

There could be different types of information of cross link interference that the terminal device 300 reports in S206. In all examples, the information of cross link interference is obtained through measurements made by the terminal device 300.

In some aspects the information of cross link interference is represented by the measurements themselves. That is, according to an embodiment, the information of cross link interference is defined by measurements obtained from measuring on the SS or SSB.

In some aspects the information of cross link interference is represented by the cell identity of the neighbouring radio access network node 140*b*. That is, according to an embodiment, the information of cross link interference is defined by cell identity of the at least one neighbouring radio access network node 140*b*, the cell identity being obtained from detection of the SS.

The terminal device 300 might thus be configured to report the SS/SSB measurements, and/or cell identities of detected neighboring radio access network nodes 140*b* to the network node 200 controlling the radio access network node 140*a* serving the terminal device 300. As disclosed above, the network node 200 might then utilize this information to identify potential aggressors and perform a radio resource management action. The SS/SSB measurements might be the RSSI, RSRP, SINR and/or RSRQ of the detected SS or SSB. For example, existing measurements for SS-RSRP, SS-SINR and/or SS-RSRQ as defined in 3GPP TS 38.215, entitled “NR; Physical layer measurements”, version 15.4.0, might be used for this purpose.

In some aspects, the terminal device 300 is configured to report measurements for all SSBs which it has detected. In other aspects, the terminal device 300 is configured to only report the SS/SSB measurements, and/or cell identities for a subset of the detected SSBs. The reported SSBs, or the neighboring radio access network nodes 140*b* associated with the reported measurements, are identified as potential aggressors. The terminal device 300 might be configured by the network node 200 with certain criteria for how to select the subset of SSB which should be reported. For instance, a threshold may be configured, and only SSBs for which the associated measurement quantity exceeds the threshold are reported. That is, according to an embodiment, the TDD configuration information only is acquired when signal strength of the synchronization signal block is measured to be above the threshold value. As above, there could be different types of thresholds. In some examples, the threshold value is given with respect to at least one of: RSSI, RSRP, SINR, and RSRQ. In further examples, the threshold is based on a spectrum mask or an adjacent channel suppression capability of the network node 200.

This may be useful since if the measurement of a detected SSB is lower than the threshold, i.e., the signal strength received from this neighboring radio access network node 140*b* is low enough to be suppressed by, for example, adjacent channel isolation, then, this detected neighboring radio access network node 140*b* does not need to be considered as a potential aggressor by the network node 200 and hence this information does not need to be reported by the terminal device 300.

The terminal device 300 might further be configured to report additional information based on the detected SSB. For instance, in some examples, the time-synchronization TDD pattern symbol start for adjacent channels is also reported. This information can be conveyed as a relative difference to the DL timing of the radio access network node 140*a* serving the terminal device 300.

The terminal device 300 might further be configured to decode the SIB1 of the detected or identified neighboring radio access network node 140*b* and then to reports the TDD configuration and/or the beam related information to the network node 200. In particular, according to an embodiment, the terminal device 300 is configured to perform (optional) step S204:

S204: The terminal device 300 acquires TDD configuration information from the at least one neighbouring radio access network node 140*b* by decoding at least one system information block in time/frequency resources transmitted by the at least one neighbouring radio access network node 140*b*. The time/frequency resources are defined by the synchronization signal block. The information of cross link interference (as reported in S206) is then defined by the TDD configuration information.

Figure 4:
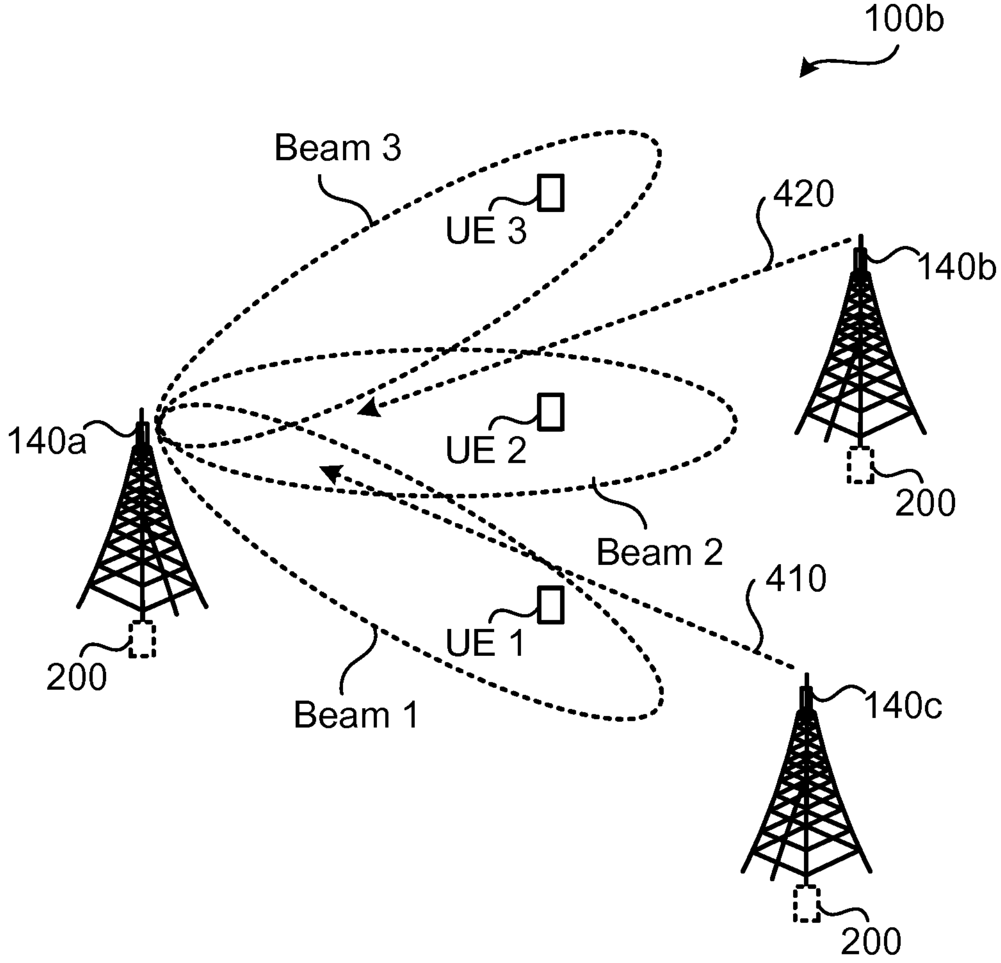

A first example of cross link interference handling will now be disclosed with reference to FIG. 4. FIG. 4 illustrates a simplified grid-of-beam example with per-beam restriction. Communication network 100*b* comprises three radio access network nodes 140*a*, 140*b*, 140*c*. Radio access network node 140*a* acts as victim and radio access network nodes 140*b*, 140*c* act as aggressors as illustrated by arrows 410, 420. Radio access network node 140*a* belongs to mobile network operator A. Radio access network nodes 140*b*, 140*c* belong to mobile network operators B and C, respectively. Radio access network node 140*a* is configured for transmission and reception in three beams; Beam 1, Beam 2, Beam 3 and in each beam serves one terminal device; UE 1, UE2, UE3.

Radio access network node 140*a* scans adjacent channels to detect SSs or SSBs from potential neighboring radio access network nodes.

Two adjacent neighboring radio access network nodes 140*b*, 140*c* are identified, each having its own TDD DL/UL configuration and each operating in its own channels.

The SS or SSB signal strength is measured per receiving beam of radio access network node 140*a*. The detected SS or SSB from radio access network node 140*c* is strong only in beam 1 and the detected SS or SSB from radio access network node 140*b* is strong only in beam 2. No strong SS or SSB is detected in beam 3.

SIB1 is read and the TDD UL/DL configurations from the two neighboring radio access network nodes 140*b*, 140*c* are obtained at radio access network node 140*a*.

There are three terminal devices to be scheduled in the UL, where the transmission of each terminal device is received by the radio access network node 140*a* using a respective one of the beams. A scheduling strategy might be imposed for radio access network node 140*a* which avoids scheduling the terminal devices UE 1, UE 2, UE 3 depending on which beam is used for the reception of the respective UL transmissions. For example, UE 1 might be restricted to not transmit in UL symbols used for DL by radio access network node 140*c*, UE 2 might be restricted to not transmit in UL symbols used for DL by radio access network node 140*b*, and UE 3 might not be restricted and it can be scheduled to transmit in all UL symbols desired according to UL/DL load and service.

Figure 5:
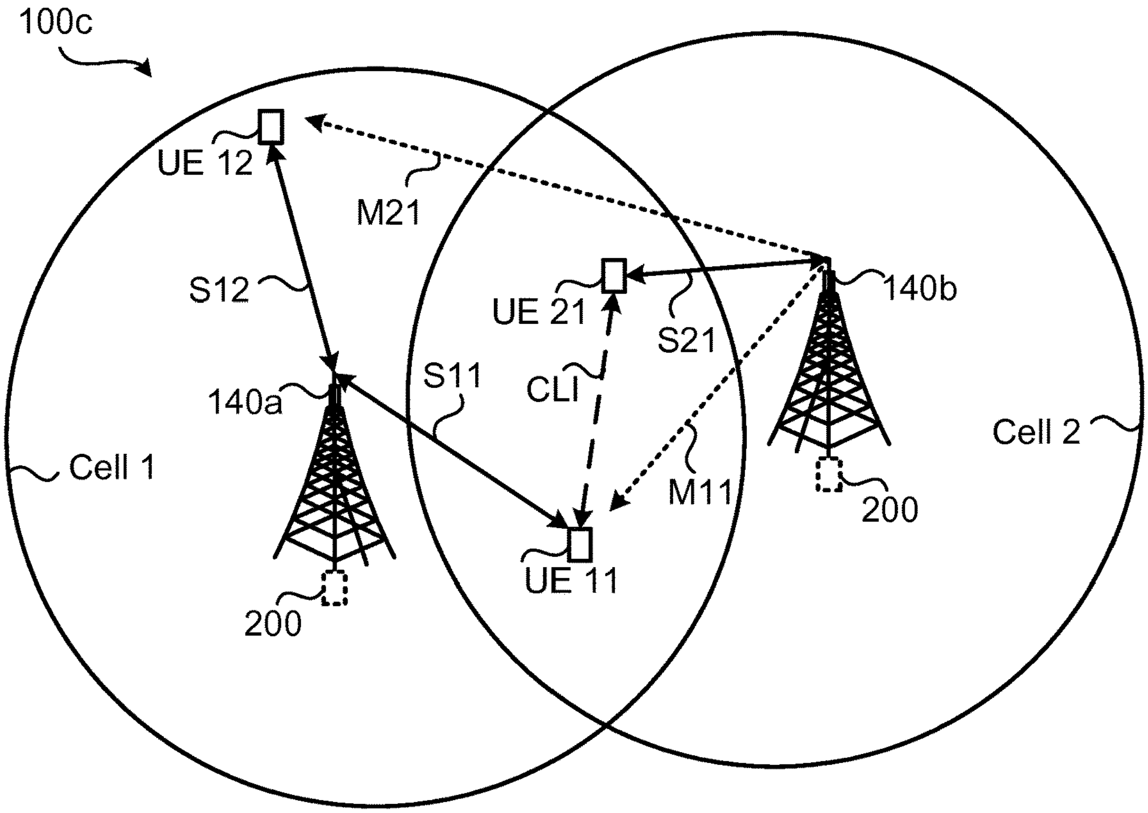

A second example of cross link interference handling and reporting will now be disclosed with reference to FIG. 5. Communication network 100*c* comprises two radio access network nodes 140*a*, 140*b*. Radio access network node 140*a* acts as victim and radio access network node 140*b* acts as aggressor. Radio access network node 140*a* belongs to mobile network operator A and serves terminal devices UE 12, UE 11 in Cell 1. Radio access network node 140*b* belongs to mobile network operator B and serves terminal device UE 21 in Cell 2.

Terminal devices UE 11 and UE 12 are operatively connected over links S11 and S12, respectively, to radio access network node 140*a*, and UE 21 is operatively connected over link S21 to radio access network node 140*b*.

Terminal devices UE 11 and UE 12 are configured to measure on the NR-AFRCNs used by radio access network node 140*b*. UE 11 and UE 12 will read SIB1 and TDD configuration comprised within it, which includes the UL/DL pattern of radio access network node 140*b*.

The signal strength of SS or SSB transmitted by the radio access network node 140*b* may also be measured. UE 11 will measure a relatively strong interfering signal M11 while UE 12 might not detect the SIB1 or possibly measure only a weak interfering signal M21.

Terminal devices UE 11 and UE 12 report the TDD pattern and signal strength to radio access network node 140*a* over links S11 and S12.

For radio access network node 140*a* the TDD UL/DL pattern for UE 11 is selected based on the reported TDD pattern for radio access network node 140*b* to avoid severe cross link interference to and from other terminal devices, such as UE 21.

The UL symbols of radio access network node 140*b* are not scheduled simultaneously as the DL symbols for UE 11 ($DL_{UE11} \neq UL_{Cell2}$) to avoid victim interference from terminal devices, such as UE 21, served by radio access network node 140*b*.

The DL symbols of radio access network node 140*b* are not scheduled simultaneously as the UL symbols for UE11 ($UL_{UE11} \neq DL_{Cell2}$) to avoid aggressor interference from terminal devices, such as UE 11, served by radio access network node 140*a* to terminal devices, such as UE 21, served by radio access network node 140*b*.

For radio access network node 140*a* the TDD UL/DL pattern for UE 12 can be selected without constrain, assuming it is isolated from transmission from terminal devices served by radio access network node 140*b*.

Figure 6:
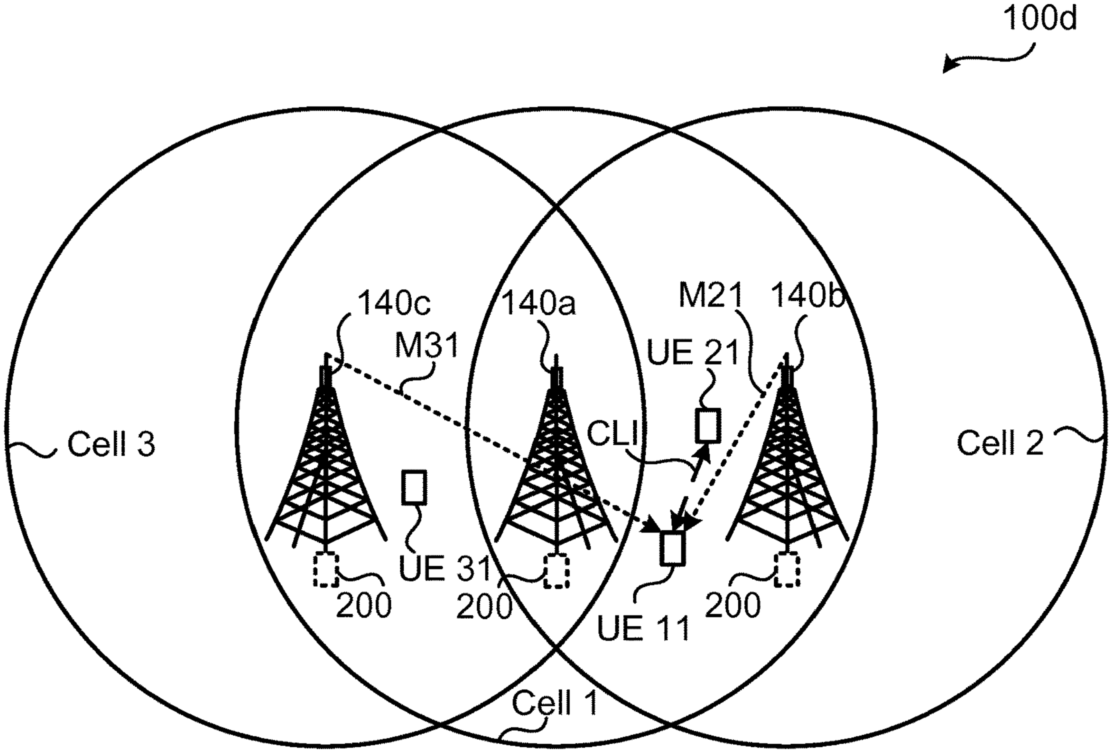

FIG. 5 is a simplified view with only a single cell per mobile network operator. But the principle is applicable for multiple cells and cross link interference cell relations as well. This is illustrated in FIG. 6. A third example of cross link interference handling and reporting will now be disclosed with reference to FIG. 6. Communication network 100*c* comprises three radio access network nodes 140*a*, 140*b*, 140*c*. Radio access network node 140*a* acts as victim and radio access network nodes 140*b*, 140*c* act as aggressors. Radio access network node 140*a* belongs to mobile network operator A and serves terminal device in cell 1. Radio access network node 140*b* belongs to mobile network operator B and serves terminal device UE 21 in cell 2. Radio access network node 140*c* belongs to mobile network operator C and serves terminal device UE 31 in cell 3.

Terminal device UE 11 is configured to measure on the NR-ARFNCs used by radio access network nodes 140*b*, 140*c*. Terminal device UE 11 thus receives interfering signals M21 and M31 from the radio access network nodes 140*b*, 140*c*, respectively. All detected cells are measured and reported, in this example Cell 2 and if detected also Cell 3. Cell 2 and Cell 3 may have different TDD patterns if dynamic UL/DL is applied by Operator B. Terminal device UE 11 reports the detected surrounding cells TDD pattern and signal strength. The TDD UL-DL symbol allocation for UE 11 is restricted to avoid sever cross link interference to and from terminal devices in cell 2, such as terminal device UE 21. The weak or not detected Cell 3 TDD pattern does not restrict the UL/DL allocation for terminal device UE 11 since terminal devices in cell 3, such as terminal device UE 31, will not have any severe cross link interference relation to terminal device UE 11.

Figure 7:
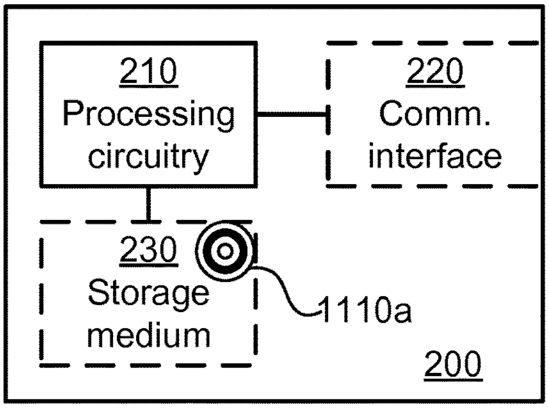
FIG. 7 is a schematic diagram showing functional units of a network node according to an embodiment.

FIG. 7 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110*a* (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 200 may further comprise a communications interface 220 for communications with other entities, functions, nodes, and devices. As such the communications interface 220 may comprise one or more transmitters and receivers, comprising analogue and digital components.

The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 8:
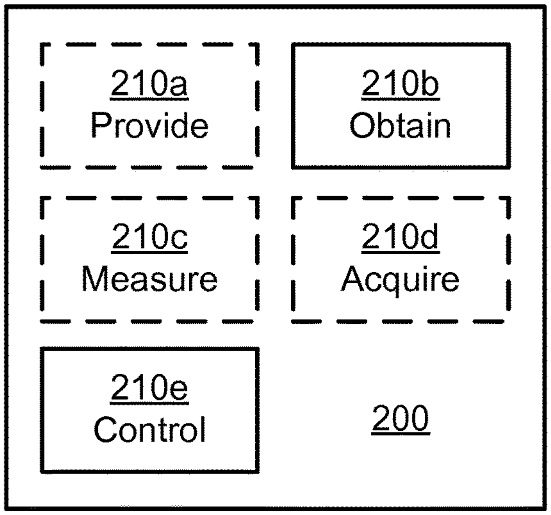
FIG. 8 is a schematic diagram showing functional modules of a network node according to an embodiment.

FIG. 8 schematically illustrates, in terms of a number of functional modules, the components of a network node 200 according to an embodiment. The network node 200 of FIG. 8 comprises a number of functional modules; an obtain module 210*b* configured to perform step S104, and a control module 210*e* configured to perform step S106. The network node 200 of FIG. 8 may further comprise a number of optional functional modules, such as any of a provide module 210*a* configured to perform step S102, a measure module 210*c* configured to perform step S104*a*, and an acquire module 210*d* configured to perform step S104*b*. In general terms, each functional module 210*a*-210*e* may be implemented in hardware or in software. Preferably, one or more or all functional modules 210*a*-210*e* may be implemented by the processing circuitry 210, possibly in cooperation with the communications interface 220 and/or the storage medium 230. The processing circuitry 210 may thus be arranged to from the storage medium 230 fetch instructions as provided by a functional module 210*a*-210*e* and to execute these instructions, thereby performing any steps of the network node 200 as disclosed herein.

The network node 200 may be provided as a standalone device or as a part of at least one further device. For example, the network node 200 may be provided in a node of the radio access network or in a node of the core network 120. Alternatively, functionality of the network node 200 may be distributed between at least two devices, or nodes. These at least two nodes, or devices, may either be part of the same network part (such as the radio access network or the core network 120) or may be spread between at least two such network parts. In general terms, instructions that are required to be performed in real time may be performed in a device, or node, operatively closer to the cell 110*a*, 110*b* than instructions that are not required to be performed in real time.

Thus, a first portion of the instructions performed by the network node 200 may be executed in a first device, and a second portion of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 7 the processing circuitry 210 may be distributed among a plurality of devices, or nodes. The same applies to the functional modules 210*a*-210*e* of FIG. 8 and the computer program 1120*a* of FIG. 11.

Figure 9:
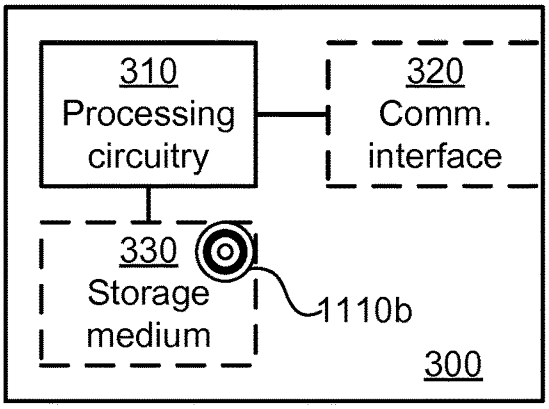
FIG. 9 is a schematic diagram showing functional units of a terminal device according to an embodiment.

FIG. 9 schematically illustrates, in terms of a number of functional units, the components of a terminal device 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1110*b* (as in FIG. 11), e.g. in the form of a storage medium 330. The processing circuitry 310 may further be provided as at least one application specific integrated circuit (ASIC), or field programmable gate array (FPGA).

Particularly, the processing circuitry 310 is configured to cause the terminal device 300 to perform a set of operations, or steps, as disclosed above. For example, the storage medium 330 may store the set of operations, and the processing circuitry 310 may be configured to retrieve the set of operations from the storage medium 330 to cause the terminal device 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The terminal device 300 may further comprise a communications interface 320 for communications with other entities, functions, nodes, and devices. As such the communications interface 320 may comprise one or more transmitters and receivers, comprising analogue and digital components.

The processing circuitry 310 controls the general operation of the terminal device 300 e.g. by sending data and control signals to the communications interface 320 and the storage medium 330, by receiving data and reports from the communications interface 320, and by retrieving data and instructions from the storage medium 330. Other components, as well as the related functionality, of the terminal device 300 are omitted in order not to obscure the concepts presented herein.

Figure 10:
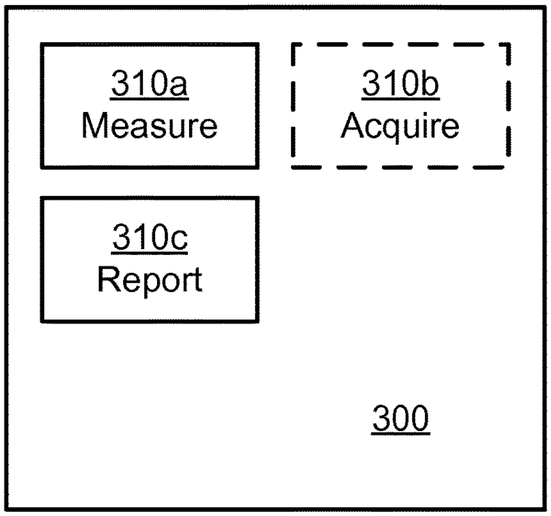
FIG. 10 is a schematic diagram showing functional modules of a terminal device according to an embodiment.

FIG. 10 schematically illustrates, in terms of a number of functional modules, the components of a terminal device 300 according to an embodiment. The terminal device 300 of FIG. 10 comprises a number of functional modules; a measure module 310*a* configured to perform step S302, and a report module 310*c* configured to perform step S306. The terminal device 300 of FIG. 10 may further comprise a number of optional functional modules, such as an acquire module 310*b* configured to perform step S304. In general terms, each functional module 310*a*-310*e* may be implemented in hardware or in software. Preferably, one or more or all functional modules 310*a*-310*e* may be implemented by the processing circuitry 310, possibly in cooperation with the communications interface 320 and/or the storage medium 330. The processing circuitry 310 may thus be arranged to from the storage medium 330 fetch instructions as provided by a functional module 310*a*-310*e* and to execute these instructions, thereby performing any steps of the terminal device 300 as disclosed herein.

Figure 11:
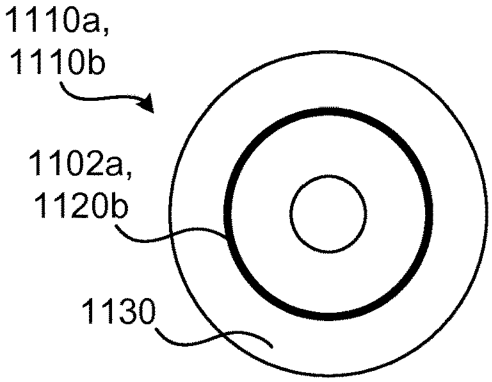
FIG. 11 shows one example of a computer program product comprising computer readable means according to an embodiment.

FIG. 11 shows one example of a computer program product 1110*a*, 1110*b* comprising computer readable means 1130. On this computer readable means 1130, a computer program 1120*a* can be stored, which computer program 1120*a* can cause the processing circuitry 210 and thereto operatively coupled entities and devices, such as the communications interface 220 and the storage medium 230, to execute methods according to embodiments described herein. The computer program 1120*a* and/or computer program product 1110*a* may thus provide means for performing any steps of the network node 200 as herein disclosed. On this computer readable means 1130, a computer program 1120*b* can be stored, which computer program 1120*b* can cause the processing circuitry 310 and thereto operatively coupled entities and devices, such as the communications interface 320 and the storage medium 330, to execute methods according to embodiments described herein. The computer program 1120*b* and/or computer program product 1110*b* may thus provide means for performing any steps of the terminal device 300 as herein disclosed.

In the example of FIG. 11, the computer program product 1110*a*, 1110*b* is illustrated as an optical disc, such as a CD (compact disc) or a DVD (digital versatile disc) or a Blu-Ray disc. The computer program product 1110*a*, 1110*b* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120*a*, 1120*b* is here schematically shown as a track on the depicted optical disk, the computer program 1120*a*, 1120*b* can be stored in any way which is suitable for the computer program product 1110*a*, 1110*b*.

Figure 12:
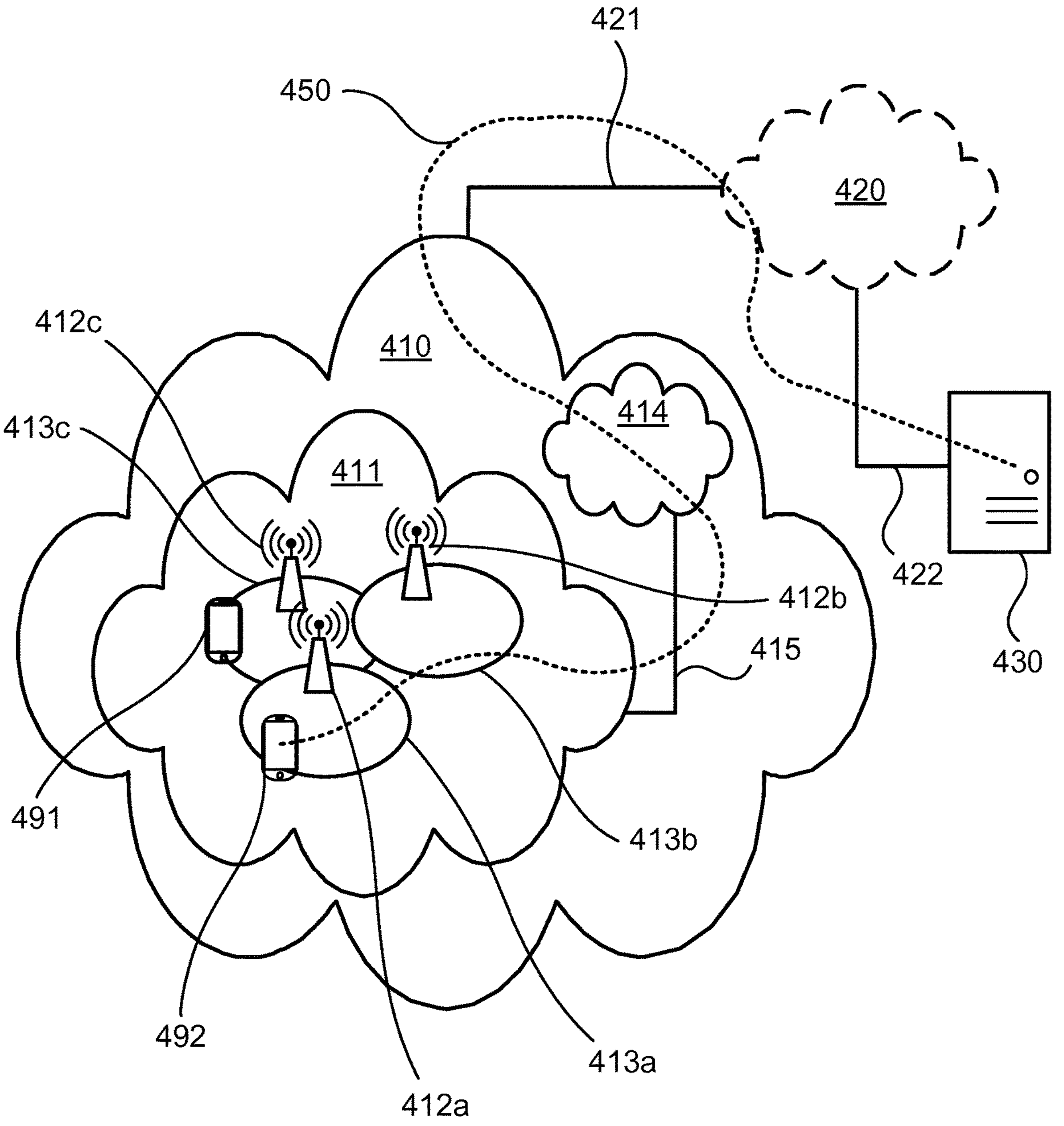
FIG. 12 is a schematic diagram illustrating a telecommunication network connected via an intermediate network to a host computer in accordance with some embodiments.

FIG. 12 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, such as the radio access network in FIG. 1, and core network 414, such as core network 120 in FIG. 1. Access network 411 comprises a plurality of radio access network nodes 412*a*, 412*b*, 412*c*, such as NBs, eNBs, gNBs (each corresponding to the network node 200 of FIG. 1) or other types of wireless access points, each defining a corresponding coverage area, or cell, 413*a*, 413*b*, 413*c*. Each radio access network nodes 412*a*, 412*b*, 412*c* is connectable to core network 414 over a wired or wireless connection 415. A first UE 491 located in coverage area 413*c* is configured to wirelessly connect to, or be paged by, the corresponding network node 412*c*. A second UE 492 in coverage area 413*a* is wirelessly connectable to the corresponding network node 412*a*. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to the terminal devices 300 of FIG. 1.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 12 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 13:
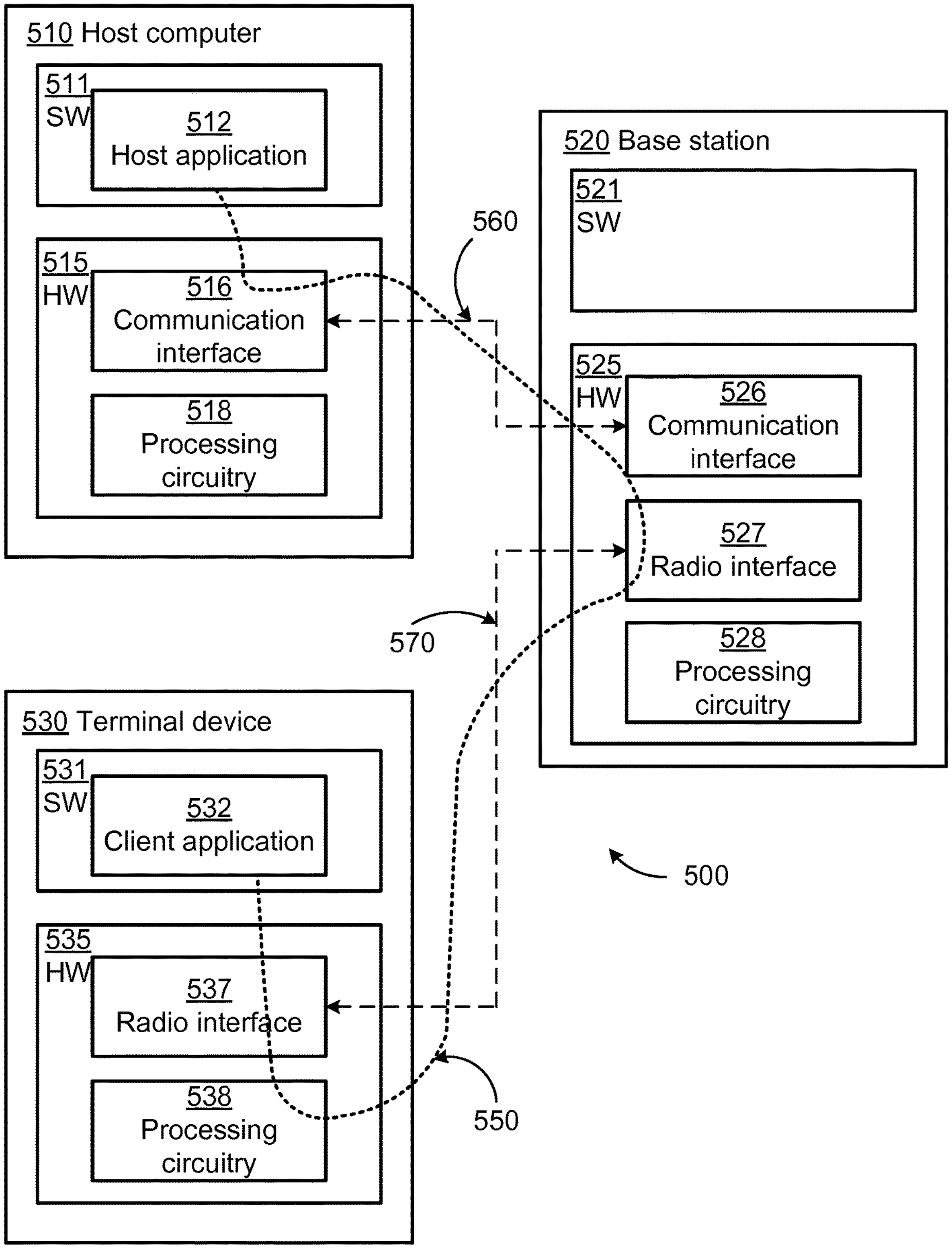
FIG. 13 is a schematic diagram illustrating host computer communicating via a radio base station with a terminal device over a partially wireless connection in accordance with some embodiments.

FIG. 13 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 13. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the terminal devices 300 of FIG. 1. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to the network node 200 of FIG. 1. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 13) served by radio access network node 520. Communication interface 526 may be configured to facilitate connection 560 to host computer 510. Connection 560 may be direct or it may pass through a core network (not shown in FIG. 13) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 13 may be similar or identical to host computer 430, one of network nodes 412*a*, 412*b*, 412*c* and one of UEs 491, 492 of FIG. 12, respectively. This is to say, the inner workings of these entities may be as shown in FIG. 13 and independently, the surrounding network topology may be that of FIG. 12.

In FIG. 13, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signaling facilitating host computer's 510 measurements of throughput, propagation times, latency and the like. The measurements may be implemented in that software 511 and 531 causes messages to be transmitted, in particular, empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for cross-link interference handling, the method being performed by a network node, the network node being configured to control a radio access network node, the method comprising:

obtaining, through measurements, information identifying cross-link interference pertaining to wireless transmission from at least one neighboring radio access network node; and controlling the radio access network node by performing a radio resource management action based on time division duplex (TDD) configuration information derivable from the obtained information of cross-link interference, wherein obtaining information of cross-link interference comprises:

measuring on a synchronization signal block transmitted by the at least one neighboring radio access network node; and acquiring the TDD configuration information from the at least one neighboring radio access network node by decoding at least one system information block in time/frequency resources transmitted by the at least one neighboring radio access network node, the time/frequency resources being defined by the synchronization signal block, wherein the TDD configuration information only is acquired when signal strength of the synchronization signal block is measured to be above a threshold value.

2. The method of claim 1, wherein the synchronization signal block is measured on frequencies given by a list of frequency bands.

3. The method of claim 1, wherein the threshold value is given with respect to at least one of: RSSI, RSRP, SINR, and RSRQ.

4. The method of claim 1, wherein the threshold value is based on a spectrum mask or an adjacent channel suppression capability of the network node.

5. The method of claim 1, wherein performing the radio resource management action comprises at least one of:

reconfiguring TDD configuration in terms of TDD UL/DL allocation of time/frequency resources for the radio access network node such that the time/frequency resources do not conflict with the cross-link interference;

determining which time/frequency resources and/or geographical areas are impacted by the cross-link interference;

identifying which at least one neighboring radio access network node is causing the cross-link interference; and reporting the cross-link interference to a central network node.

6. The method of claim 1, wherein the at least one neighboring radio access network node is configured for beamformed transmission, and wherein the information of cross-link interference is obtained per beam or beam-direction of the beamformed transmission.

7. The method of claim 1, wherein, when pieces of information of cross-link interference pertaining to wireless transmission from at least two neighboring radio access network nodes are obtained, the pieces of information are combined when controlling the radio access network node.

8. The method of claim 1, wherein the TDD configuration information is defined by parameter tdd-UL-DL-ConfigurationCommon.

9. A method for cross-link interference reporting, the method being performed by a terminal device, the terminal device being served by a radio access network node controlled by a network node, the method comprising:

measuring on a synchronization signal block transmitted by at least one neighboring radio access network node, thereby obtaining information identifying cross-link interference pertaining to wireless transmission from the at least one neighboring radio access network node, wherein the measuring is performed in accordance with a configuration provided by the network node, the configuration indicating that the measurements are for interference purposes by setting a threshold value for the measurements such that the terminal device is configured to only report measurements above the threshold value;

reporting, to the network node and in accordance with the configuration, the information of cross-link interference; and acquiring time division duplex (TDD) configuration information from the at least one neighboring radio access network node by decoding at least one system information block in time/frequency resources transmitted by the at least one neighboring radio access network node, the time/frequency resources being defined by the synchronization signal block, and wherein the information of cross-link interference is defined by the TDD configuration information.

10. The method of claim 9, wherein the threshold value is given with respect to at least one of: RSSI, RSRP, SINR, and RSRQ.

11. The method of claim 9, wherein the threshold is based on a spectrum mask or an adjacent channel suppression capability of the network node.

12. The method of claim 9, wherein the TDD configuration information only is acquired when signal strength of the synchronization signal block is measured to be above the threshold value.

13. The method of claim 9, wherein the information of cross-link interference is defined by measurements obtained from measuring on the synchronization signal block.

14. The method of claim 9, wherein the information of cross-link interference is defined by cell identity of the at least one neighboring radio access network node, the cell identity being obtained from measuring on the synchronization signal block.

15. A network node for cross-link interference handling, the network node being configured to control a radio access network node, the network node comprising processing circuitry, the processing circuitry being configured to cause the network node to:

obtain, through measurements, information identifying cross-link interference pertaining to wireless transmission from at least one neighboring radio access network node; and control the radio access network node by performing a radio resource management action based on time division duplex (TDD) configuration information derivable from the obtained information of cross-link interference, wherein obtaining information of cross-link interference comprises:

measuring on a synchronization signal block transmitted by the at least one neighboring radio access network node; and acquiring the TDD configuration information from the at least one neighboring radio access network node by decoding at least one system information block in time/frequency resources transmitted by the at least one neighboring radio access network node, the time/frequency resources being defined by the synchronization signal block, wherein the TDD configuration information only is acquired when signal strength of the synchronization signal block is measured to be above a threshold value.

16. A terminal device for cross-link interference reporting, the terminal device being configured to be served by a radio access network node controlled by a network node, the terminal device comprising processing circuitry, the processing circuitry being configured to cause the terminal device to:

measure on a synchronization signal block transmitted by at least one neighboring radio access network node, thereby obtaining information identifying cross-link interference pertaining to wireless transmission from the at least one neighboring radio access network node, wherein the measuring is performed in accordance with a configuration provided by the network node, the configuration indicating that the measurements are for interference purposes by setting a threshold value for the measurements such that the terminal device is configured to only report measurements above the threshold value;

report, to the network node and in accordance with the configuration, the information of cross-link interference; and acquire time division duplex (TDD) configuration information from the at least one neighboring radio access network node by decoding at least one system information block in time/frequency resources transmitted by the at least one neighboring radio access network node, the time/frequency resources being defined by the synchronization signal block, and wherein the information of cross-link interference is defined by the TDD configuration information.

* * * * *